Figure 1:
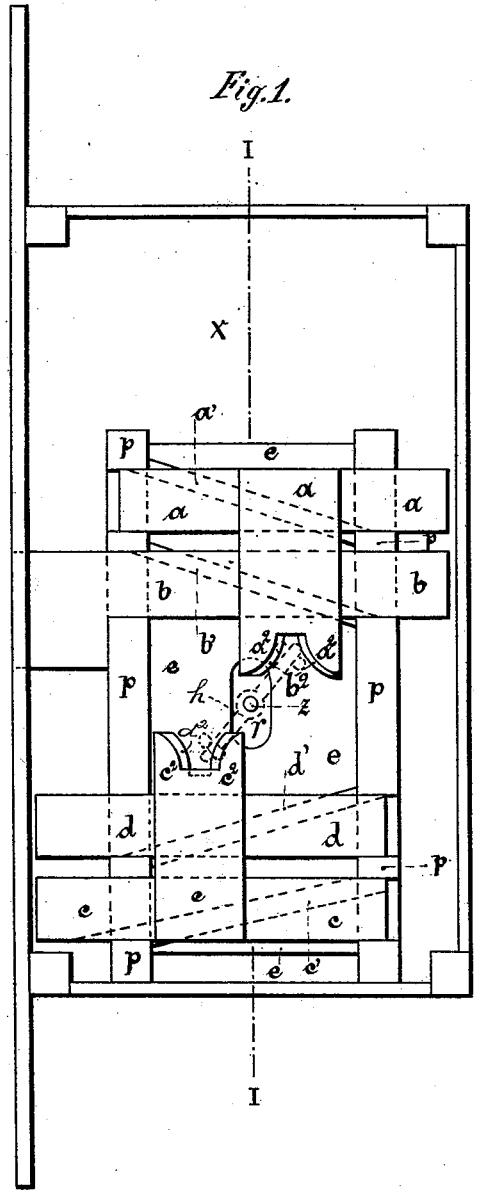

(Model.) 2 Sheets—Sheet 1.
B. HEIMSOETH.
LOCK.

No. 425,788. Patented Apr. 15, 1890.

Witnesses:
Joseph Qurally
Carl Spegor

Inventor:
Bartholomaeus Heimsoeth
by
Heuratel
Attys.

(Model.)
2 Sheets—Sheet 2.
B. HEIMSOETH.
LOCK.
No. 425,788.
Patented Apr. 15, 1890.
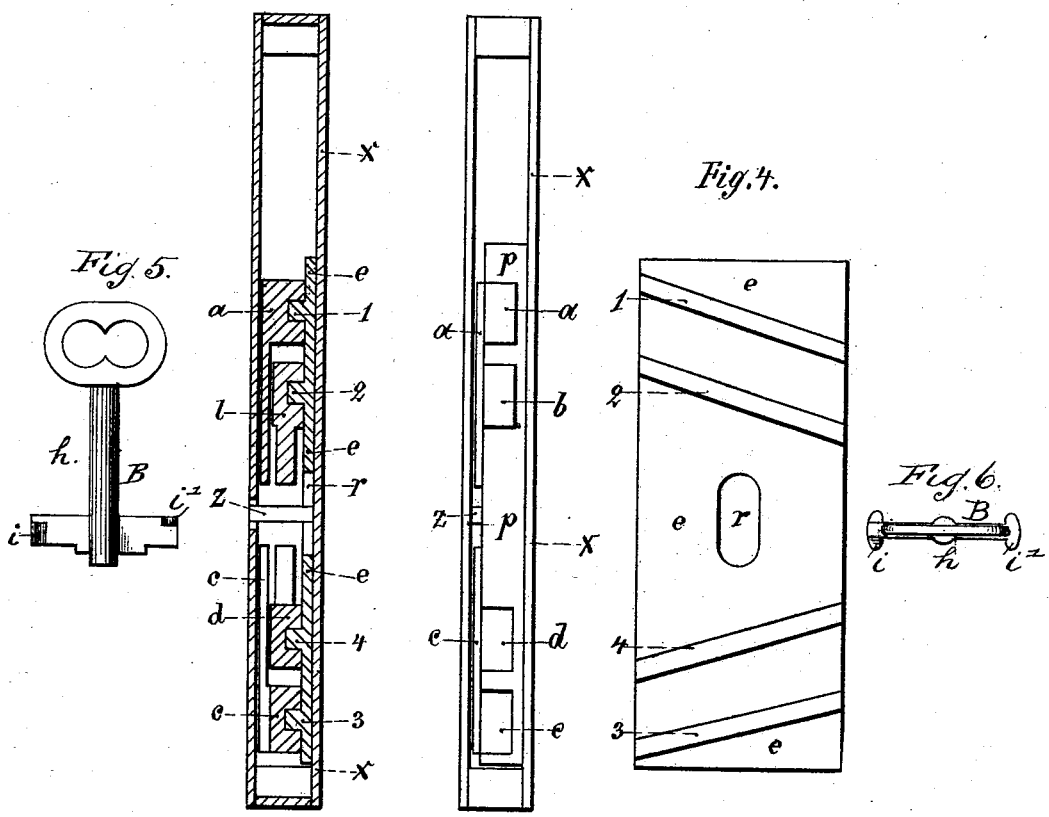
Witnesses:
Joseph Purath.
Carl Speger.
Inventor:
Bartholomaeus Heimsoeth
by
H. W. Rarah
Att'ies.

UNITED STATES PATENT OFFICE.

BARTHOLOMAEUS HEIMSOETH, OF COBLENTZ, PRUSSIA, GERMANY.

LOCK.

SPECIFICATION forming part of Letters Patent No. 425,788, dated April 15, 1890.

Application filed May 24, 1888. Serial No. 275,017. (Model.) Patented in England April 5, 1888, No. 5,090.

*To all whom it may concern:*

Be it known that I, BARTHOLOMAEUS HEIMSOETH, of Coblentz, in the Kingdom of Prussia and German Empire, have invented a new and useful Safety-Lock without Spring, (for which invention I have obtained English Letters Patent No. 5,090, of April 5, 1888,) of which the following is a specification.

This invention relates to a safety-lock without spring whose bolts have a continuous motion upon a common guide-plate.

In the accompanying drawings, Figure 1 is a plan of the lock, the cover-plate being removed. Fig. 2 is a longitudinal section of the lock on line I I of Fig. 1. Fig. 3 is a back view of the said lock. Fig. 4 is a plan of the guiding-plate, and Figs. 5 and 6 a side view and a plan view of the form of key employed.

Locks employed hitherto and known to me have to be provided with stop-pieces for firmly securing and for releasing the bolts, these pieces being so actuated by springs that they can only be lifted out of such bolts when the latter are in a predetermined position and properly shot. The springs used in such locks increase considerably their cost, as the former are the more expensive of the different parts of the lock—viz., the bolt or locking-bar, the stop or locking pieces, and the key. Furthermore, owing to the use of springs acting upon stop or locking pieces, the key is subjected to heavy wear, and after a short time often becomes useless. Lastly, the use of springs in locks of otherwise superior construction may also lead to a stoppage of their mechanism, owing to the said springs becoming idle or ceasing to act.

The lock hereinafter described obviates the above-mentioned defects. This lock operates in such a manner that during the to-and-fro motion of the bolt or bolts a plate is pushed forward in a perpendicular direction or direction at right angles to that of the said bolt or bolts, suitable guides being arranged upon that plate in an oblique direction. Besides the bolt serving to operate the lock, there are arranged auxiliary bolts whose motion is controlled in a like manner by means of straight guides arranged in oblique directions upon the guiding-plate, and whereby all the bolts are adapted to move in unison. Whenever a ward of the key used to open the lock happens to be either too high or not high enough, one of the bolts or bars will be pushed forward slightly in front of the others or will remain a little behind, and hence a tooth or projection of the bolt or bolts will engage a rib on the guiding-plate, so that neither the opening nor the shutting of the lock can be effected.

The lock consists, essentially, of the base-plate $x$, upon which are arranged two guiding-bars $p\ p$ perpendicularly to the bolt. Between these guiding-bars $p\ p$ moves the guiding-plate $e$, which is provided on its upper surface with ribs, here shown as square, 1 2 3 4. (See Fig. 4.) These ribs are arranged in such a manner that they form an angle with the bolts, moving perpendicularly to the guiding-plate $e$. The ribs 1 and 2 run in contrary directions to that of the ribs 3 and 4. The guiding-plate $e$ has, moreover, a central opening $r$, which permits the plate $e$ to move freely without striking against the key-pin $z$, which is arranged upon the base-plate. The bolts $a\ b\ c\ d$, moving perpendicularly to the guiding-plate $e$, are furnished with grooves $a'\ b'\ c'\ d'$, and have consequently a well-determined course or travel upon the guiding-plate $e$, the grooves $a'\ b'\ c'\ d'$ of the former moving upon the square ribs 1 2 3 4 of the latter in the manner described. The motion of the various bolts $a\ b\ c\ d$ is carried out by means of the notched projections $a^2\ b^2\ c^2\ d^2$ in the same manner as in other locks, whereby the position and the width of the opening or space between two consecutive projections are dependent upon the size and width of the key-bit.

In the arrangement shown in Figs. 1 to 4 a double key B (shown in Figs. 5 and 6, and provided with stem $h$ and bits $i$ and $i'$) is used, which carries a bit on each of two opposite sides, which bits when introduced into the above-mentioned openings engage at the same time with the notches in projections $a^2\ b^2$ and $c^2\ d^2$, respectively. When the projections $a^2\ b^2\ c^2\ d^2$ are suitably arranged to correspond accurately with the form and proportions of the key, no resistance will be offered to any of the bolts, and when the lock is shut the bolts $a$ and $b$ will move forward and the bolts $c\ d$ rearwardly, exerting a pressure by means of their grooves $a'\ b'\ c'\ d'$ upon the ribs 1 2 3 4 of the guiding-plate $e$, so that the latter moves downwardly. All the bolts move simultaneously, so that the motion of the guiding-plate can be in no wise impeded, such motion being, therefore, a very easy one. Should it, however, occur that in consequence of making use of an improperly-fitting key one of the projections of the bolts is seized and acted upon too soon or too late, the corresponding bolt would also move too soon or too late, and its rib would offer a certain amount of resistance to the guiding-plate $e$. The resistance is again greater the more the form and proportions of the key-bit differ from that of the bolts; hence from the moment when the biting of the faulty key takes place the lock can be moved neither forward nor backward. In the lock shown in the accompanying drawings the bolt or bar $b$ serves as main bolt or bar, the bolts or bars $a\ c\ d$ being only additional or assistant bolts. By increasing the number of bolts used the safety in opening or closing the lock is augmented.

What I claim, and desire to secure by Letters Patent of the United States, is—

In a lock, the combination, with the guiding-plate $e$, provided with the obliquely-arranged ribs 1 2 3 4, of the guiding-bars $p$, the bolts $a\ b\ c\ d$, provided with the grooves $a'\ b'\ c'\ d'$, and the notched projections $a^2, b^2, c^2$, and $d^2$, substantially as and for the purpose described.

In witness whereof I have hereunto set my hand in presence of two witnesses.

BARTHOLOMAEUS HEIMSOETH.

Witnesses:
NICOLA HEIMSOETH,
GUSTAVE ALBERT OELRICHS.